(12) United States Patent
Tuinstra

(10) Patent No.: US 7,453,820 B2
(45) Date of Patent: Nov. 18, 2008

(54) SYSTEM AND METHOD FOR MEASURING DATA NETWORK QUALITY

(75) Inventor: Franciscus Libertus Tuinstra, Voorburg (NL)

(73) Assignee: Koninklijke KPN N.V., The Hague (NL)

( * ) Notice: Subject to any disclaimer, the term of this patent is extended or adjusted under 35 U.S.C. 154(b) by 919 days.

(21) Appl. No.: 10/826,167

(22) Filed: Apr. 16, 2004

(65) Prior Publication Data

US 2004/0228284 A1 Nov. 18, 2004

Related U.S. Application Data

(60) Provisional application No. 60/463,455, filed on Apr. 16, 2003.

(51) Int. Cl.
*G01R 31/08* (2006.01)

(52) U.S. Cl. .................................................. 370/252
(58) Field of Classification Search ................. 370/332, 370/333, 395.52, 252
See application file for complete search history.

(56) References Cited

U.S. PATENT DOCUMENTS

| 5,862,326 A * | 1/1999 | Bapat ......................... 709/203 |
| 6,012,096 A * | 1/2000 | Link et al. ................... 709/233 |
| 6,831,912 B1 * | 12/2004 | Sherman ...................... 370/349 |

* cited by examiner

*Primary Examiner*—Chirag G Shah
*Assistant Examiner*—Nima Mahmoudzadeh
(74) *Attorney, Agent, or Firm*—Michaelson & Associates; Peter L. Michaelson

(57) ABSTRACT

A system and method for measuring quality of a data network and specifically through use of a client computer and a server computer communicating with each other, over the network, using a connection-less transmission protocol.

26 Claims, 3 Drawing Sheets

| 101 | PACKET TYPE VALUE |
| 102 | SEQUENCE NUMBER |
| 103 | FIRST TIMESTAMP |
| 104 | CLIENT PAYLOAD |
| 105 | SECOND TIMESTAMP |
| 106 | SERVER PAYLOAD |

Fig.2

| 201 | TIME-OUT VALUE |
| 202 | SERVER INTERVAL VALUE |
| 203 | QUANTITY VALUE |
| 204 | SERVER SIZE PACKET VALUE |

Fig.3

SYSTEM AND METHOD FOR MEASURING DATA NETWORK QUALITY

CLAIM TO PRIORITY

This application claims the benefit of our co-pending United States provisional patent application entitled "METHOD AND SYSTEM TO MEASURE PACKET SWITCHED NETWORK QUALITY" filed Apr. 16, 2003 and assigned Ser. No. 60/463,455, which is incorporated by reference herein.

BACKGROUND OF THE DISCLOSURE

1. Field of the Invention

The invention relates to a system and a method for measuring the quality of a data network. More specifically, the invention relates to a system and a method for measuring the quality of a data network using a client computer and a server computer communicating using a connection-less transmission protocol.

2. Description of the Prior Art

A method to measure data networks is known from Iperf (http://dast.nlanr.net/Projects/Iperf). Iperf uses TCP and UDP to measure the performance of an IP network. With UDP, Iperf is able to measure packet loss and delay jitter.

Another method to measure data networks is known from rfc792. Rfc792 describes the Internet Control Message Protocol (ICMP). With ICMP, it is possible to send measurement data packets between two computers. A first computer sends an ICMP packet containing an originate timestamp to a second computer. The second computer adds a receive timestamp to the ICMP packet when it receives the packet and adds a transmit timestamp to the ICMP packet when it sends the packet back to the first computer.

Aim of the Invention

The aim of the invention is to provide an alternative system and method for measuring the quality of a data network.

SUMMARY OF THE INVENTION

The present invention provides an alternative solution for measuring the quality of a data network.

According to an aspect of the invention a system is provided for measuring the quality of a data network, the system comprising a client computer and a server computer, the client computer and the server computer being arranged to communicate via the data network using a connection-less transmission protocol, e.g., UDP/IP.

The client computer can be arranged to send one or more data packets to the server computer. The client computer can comprise a client processor connected to a client memory, the client processor being arranged to read from the client memory, for each data packet, a client interval value, a client packet size value and a packet type value. The client memory can be a file stored on a disk, making it possible to permanently store the information. The packet type value can be a representation of "normal packet" or "burst packet", the latter enabling different network quality calculations for different types of packets. The data packets can comprise a first timestamp indicating the time of sending. The client computer can be arranged to send the data packets with a client interval time equal to the client interval value, the data packets comprising the packet type value and a client payload, the client payload filling the data packets up to a first predefined size equal to the client packet size value. The client payload can be a predefined bit pattern or a random bit pattern. Each data packet can comprise a sequence number, enabling the identification of the order of the packets.

The server computer can be arranged to receive at least one of the data packets. The server computer can comprise a server processor connected to a server memory. The server processor can be arranged to read from the server memory a timeout value indicating the predefined amount of time, a server interval value, a quantity value or a server packet size value. The server computer can further be arranged to send, for each received data packet, a modified data packet to the client computer, the modified data packet comprising the first timestamp and a second timestamp indicating the time of receiving. The modified data packet can comprise a server payload, the server payload filling the modified data packet up to a second predefined size equal to the server packet size value. This enables measuring asymmetric network load where uplink and downlink have different packet sizes. The server payload can be a predefined bit pattern or a random bit pattern. The server computer can be arranged to send one or more timeout data packets to the client computer when a predefined amount of time elapsed since receiving the last data packet in the server computer. This is advantageous because it increases the detectability of lost packets. The server computer can be arranged to send the timeout data packets with a server interval time equal to the server interval value, until a next data packet is received. The maximum number of timeout data packets sent can be equal to the quantity value. This enables a controlled detection of lost packets.

The client computer can be arranged to send a configuration packet to the server. The configuration packet can comprise the timeout value, the server interval value, the quantity value and/or the server packet size value. This can be advantageous because the same client computer using the same connection-less transmission protocol can be used. For configuration, the client computer can be arranged to communicate with the server computer via the data network using a connection-oriented transmission protocol, e.g., TCP/IP. This can be advantageous when it has to be guaranteed that the server computer correctly receives configuration data. The server computer is arranged to receive the configuration packet. The server processor can be arranged to write to the server memory the timeout value, the server interval value, the quantity value and/or the server packet size value, so it becomes immediately available for use.

The client computer can be arranged to store a log file. The log file can comprise all modified data packets received from the server computer. The log file can further comprise all timeout data packets received from the server computer. All modified data packets received from the server computer can be stored in a first log file. All timeout data packets received from the server computer can be stored in a second log file. Each data packet can be stored in a ring buffer. The client computer can be arranged to check each modified data packet received from the server with the contents of the ring buffer. The client computer can be arranged to delete the data packet from the ring buffer if the corresponding modified data packet is not received within the length of the ring buffer, and in this case store the data packet in the second log file.

The client computer can arranged to calculate a round-trip time by subtracting the first timestamp from a timestamp indicating when the modified data packet is received in the client computer. The client computer can be arranged to store the round-trip time in the first log file, enabling later usage of the data.

The client computer can be arranged to calculate a client-to-server latency by subtracting the second timestamp from the first timestamp. The client computer can be arranged to store the client-to-server latency in the first log file, enabling its later usage.

The client computer can be arranged to read from the first log file the packet type value, the client-to-server latency and the round-trip time. The client computer can be arranged to calculate, for each modified data packet with the packet type value equal to the representation of "normal packet", a server-to-client latency by subtracting the client-to-server latency from the round-trip time.

The client computer can be arranged to read from the first log file the packet type value. The client computer can be arranged to calculate a downlink bandwidth using:

(#BytesPerPacket+Overhead)*(#BurstPackets)/(t2−t1)

where #BytesPerPacket equals the length of the modified data packet in bytes; Overhead equals the length of protocol header overhead in bytes; #BurstPackets equals the number of modified data packets stored in the first log file with the packet type value equal to the representation of "burst packet"; t1 equals a timestamp indicating when the first modified data packet is received in the client computer; t2 equals a timestamp indicating when the last modified data packet is received in the client computer.

The client computer can be arranged to read from the first log file the packet type value. The client computer can be arranged to calculate an uplink bandwidth using:

(#BytesPerClientPacket+Overhead)*(#BurstPackets)/
((t2+t4)−(t1+t3))

where #BytesPerClientPacket equals the length of the data packet in bytes; Overhead equals the length of protocol header overhead in bytes; #BurstPackets equals the number of modified data packets stored in the first log file with the packet type value equal to the representation of "burst packet"; t1 equals a timestamp indicating when the first modified data packet is received in the client computer; t2 equals a timestamp indicating when the last modified data packet is received in the client computer; t3 equals the client-to-server latency of the first modified data packet; t4 equals the client-to-server latency of the last modified data packet.

The client computer can be arranged to read from the first log file the round-trip time and the sequence number. The client computer can be arranged to calculate a round-trip outage using:

if($Rtt2-Rtt1$)>t5 then round-trip outage=true where Rtt2 equals the round-trip time; Rtt1 equals the round-trip time of the previous modified data packet, the client computer being arranged to identify the previous modified data packet by the sequence number; t5 equals a predefined amount of time.

The client computer can be arranged to read from the first log file the client-to-server latency and the sequence number. The client computer can be arranged to calculate a downlink outage using:

if($Rtt4-Rtt3$)>t5 then downlink outage=true where Rtt4 equals the client-to-server latency; Rtt3 equals the client-to-server latency of the previous modified data packet, the client computer being arranged to identify the previous modified data packet by the sequence number; t5 equals a predefined amount of time.

The client computer can be arranged to read the sequence number from the first log file. The client computer can be arranged to calculate an uplink outage using:

if($Rtt6-Rtt5$)>t5 then uplink outage=true where Rtt6 equals the server-to-client latency; Rtt5 equals the server-to-client latency of the previous modified data packet, the client computer being arranged to identify the previous modified data packet by the sequence number; t5 equals a predefined amount of time.

The client computer can be arranged to determine a number of lost packets between two modified data packets, by analyzing the sequence numbers. This provides a good overview of packet loss.

The client computer can be arranged to combine the calculated values with low-level measurement data from a mobile telephone and/or geographic information data. This is advantageous when poor data network quality is to be indicated in geographical areas, simplifying a search for weak spots in the data network.

According to an aspect of the invention a method is provided for measuring the quality of a data network in a system comprising a client computer and a server computer, the client computer and the server computer being arranged to communicate via the data network using a connection-less transmission protocol. The method can comprise one or more of the steps of sending one or more data packets from the client computer to the server computer, the data packets comprising a first timestamp indicating the time of sending, receiving at least one of the data packets in the server computer, sending, for each received data packet, a modified data packet from the server computer to the client computer, the modified data packet comprising the first timestamp and a second timestamp indicating the time of receiving, sending one or more timeout data packets from the server computer to the client computer when a predefined amount of time elapsed since receiving the last data packet in the server computer, reading from a server memory in the server computer a timeout value indicating the predefined amount of time, a server interval value and a quantity value, sending the timeout data packets with a server interval time equal to the server interval value, until a next data packet is received, and the maximum number of timeout data packets equals the quantity value, reading from a client memory in the client computer for each data packet a client interval value, a client packet size value and a packet type value, sending the data packets with a client interval time equal to the client interval value, the data packets comprising the packet type value and a client payload, the client payload filling the data packets up to a first predefined size equal to the client packet size value.

BRIEF DESCRIPTION OF THE DRAWINGS

The invention will be explained in greater detail by reference to exemplary embodiments shown in the drawings, in which:

FIG. 2 shows a data packet or a modified data packet and its elements;

FIG. 3 shows a configuration packet and its elements;

DETAILED DESCRIPTION OF THE INVENTION

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

The measurement system consists of a client-server approach. The invention is explained for usage in a GPRS network, but can also be used in any other packet switched network, such as, among others, UMTS, LAN, WAN and Internet. As a connection-less transmission protocol, the UDP/IP protocol is used in the examples. Other connection-less transmission protocols could just as well have been used.

Figure 1:
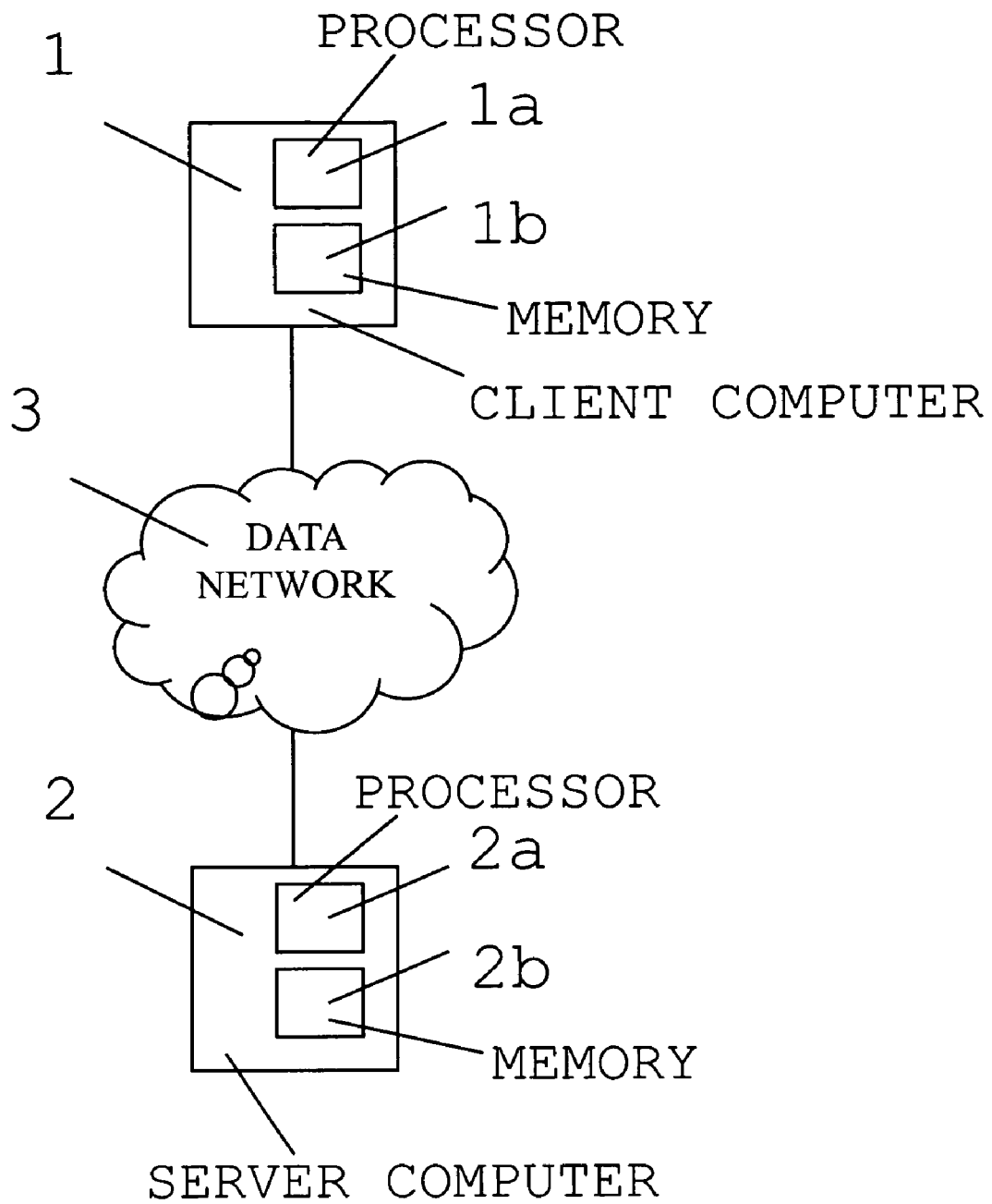
FIG. 1 shows an architectural overview of the system.

Generally speaking and as depicted in FIG. 1, the inventive system for measuring the quality of data network 3 has client computer 1 and server computer 2, with the client and the server computers being arranged to communicate via data network 3 using a connection-less transmission protocol, e.g., UDP/IP.

Client computer 1 sends one or more data packets to the server computer. The client computer contains client processor 1a connected to client memory 1b. The client processor reads, from the client memory and for each data packet, a client interval value, a client packet size value and a packet type value. Client memory 1b can be a file stored on a disk in order to permanently store the information. As shown in FIG. 2, each such data packet contains the following fields: packet data type value field 101, sequence number field 102, first timestamp field 103, client payload field 104, second timestamp field 105 and server payload field 106. The packet type value signifies that the corresponding packet is either a "normal packet" or a "burst packet", thus enabling different network quality calculations for different types of packets. The first timestamp (field 103) indicates a time at which the data packet was sent. The client computer sends the data packets with an interval time (i.e., time between two such successive packets) equal to the client interval value. The client payload (field 104) fills the data packet to a first predefined size equal to the client packet size value. The client payload can be a predefined bit pattern or a random bit pattern. The sequence number (field 102) specifically identifies a particular packet relative to and in a sequence of such packets.

Server computer 2, shown in FIG. 1, receives at least one of the data packets. The server computer contains server processor 2a connected to server memory 2b. The server processor reads, from the server memory, a time-out value indicating a predefined amount of time, a server interval value, a quantity value and a server packet size value. The server computer sends, for each received data packet from the client computer, a modified data packet back to the client computer and which includes the four fields in the data packet itself (fields 101, 102, 103 and 104) and two additional fields—all collectively as shown in FIG. 2, with the latter two fields being: the second timestamp (field 105) which indicates a time at which the data packet was received at the server and the server payload (field 106) which fills the modified data packet to a second predefined size equal to the server packet size value. Use of the client and server payload fields enables measurement of asymmetric network loading where uplink and downlink have different packet sizes. The server payload can be a predefined bit pattern or a random bit pattern. Server computer 2 sends one or more time-out data packets to the client computer after a predefined amount of time has elapsed since the time it received its most recent data packet. This is advantageous because it increases the detectability of lost packets. The server computer sends successive time-out data packets with an interval time (here being the time between two such successive packets) equal to the server interval value, until a next data packet is received. The maximum number of the time-out data packets that is so sent in any one instance is given by the quantity value. This enables a controlled detection of lost packets.

The client computer sends a configuration packet to the server. The configuration packet, as shown in FIG. 3, contains the following fields: time-out value field 201, server interval value field 202, quantity value field 203 and server packet size value field 204. This can be advantageous because the same client computer, through the same connection-less transmission protocol, can be used. Alternatively, for configuration, the client computer can communicate with the server computer via the data network using a connection-oriented transmission protocol, e.g., TCP/IP. This can be advantageous in those instances where when it has to be guaranteed that the server computer will correctly receive configuration data. After the server computer receives the configuration packet, it writes, to the server memory, the time-out value, the server interval value, the quantity value and the server packet size value from the configuration packet, so that these values are immediately available for use.

Figure 4:
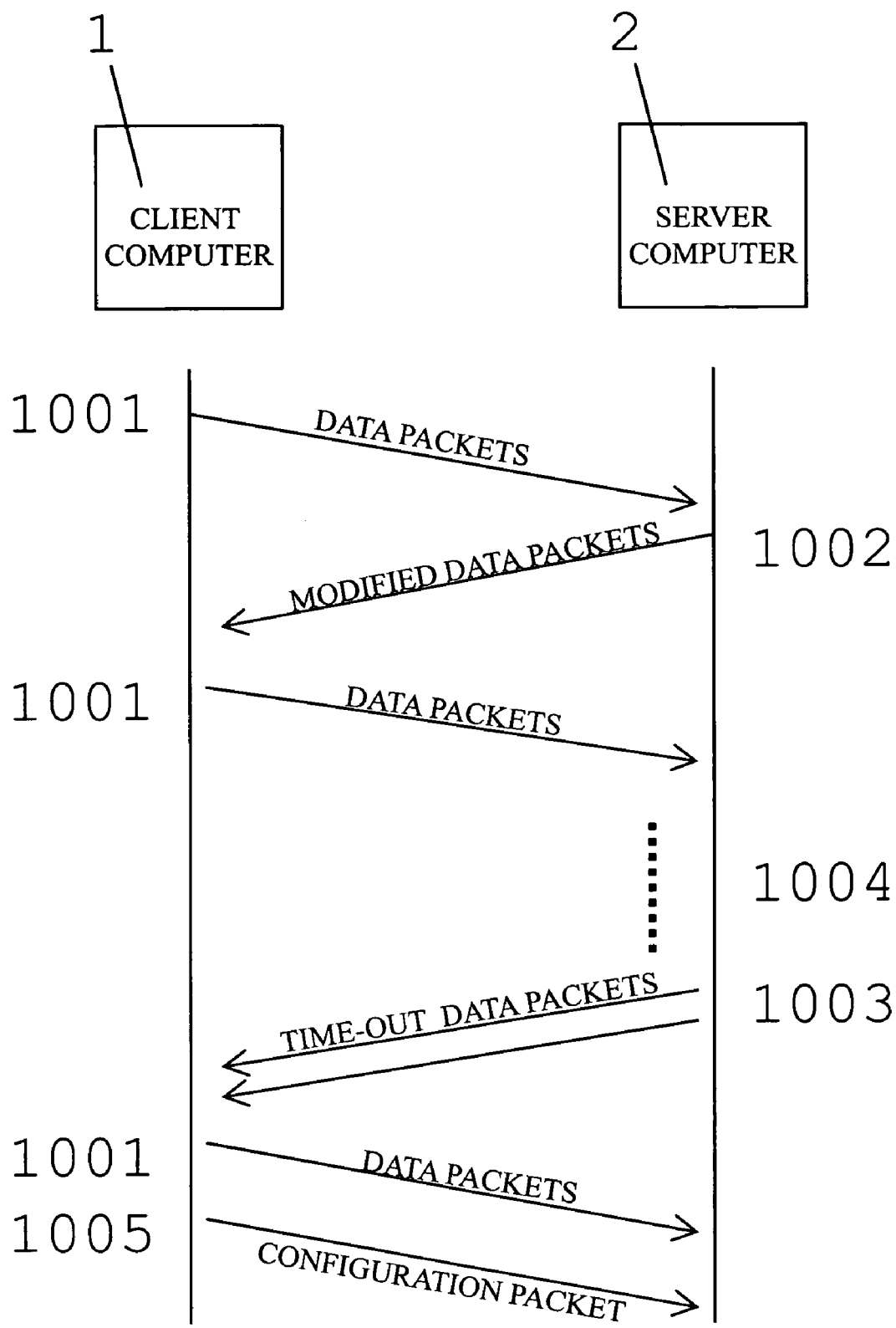
FIG. 4 shows a time sequence diagram of packets sent between a client computer and a server computer.

FIG. 4 depicts, in accordance with the present invention, a typical sequence of packets sent between client computer 1 and server computer 2. First, the client computer sends, as symbolized by reference numeral 1001, data packets to the server computer which, in turn, modifies each of the packets and sends a corresponding modified data packet back, the latter operation being symbolized by reference numeral 1002. These operations then continue over time as indicated by reference numeral 1004. Eventually, after a most recent data packet (1001) has been received by server computer 2 and a time-out interval has expired, the server computer sends time-out data packets, as symbolized by reference numeral 1003, to the client computer. In response, the client computer can send further data packets or configuration packets back to the server computer, with these operations being symbolized by respective reference numerals 1001 and 1005.

The client computer stores a log file, illustratively having two portions such as separate first and second log files. The log file can contain, in the first portion, all modified data packets received from the server computer and, in the second portion, all time-out data packets received from the server computer. Each data packet, as transmitted by the client computer, can be stored in a ring buffer. The client computer checks each modified data packet received from the server with the contents of the ring buffer and, when the corresponding modified data packet is not received within a length of the ring buffer, deletes the associated data packet from the ring buffer and stores that data packet in the second portion of the log file.

Illustratively, the client computer is a laptop computer in a car connected via a GPRS phone to the GPRS network. Other clients can be used. The client computer sends a defined pattern of UDP packets to the server computer. The server responses to each data packet with another packet (a modified data packet).

UDP is a OSI level 4 protocol which leaves the IP behavior as transparent as possible. Unlike TCP (the other level well known 4 protocol) UDP does not restrict transmission of packets or force retransmissions in case of missed packets. By using UDP a level 7 application can keep full contact with the IP layer.

The UDP server is located on a fixed position in the data network to be tested. For example, the server 2 can be directly connected to an Access Point of a GGSN to avoid measurement inaccuracies. Later, the server was connected to the Internet, which introduced only a few milliseconds extra delay which is negligible with respect to the delay in the GPRS system.

The server responds to each packet with the same packet, extended with its time of arrival and possibly filled up with a predefined extra payload.

In case the server does not receive any UDP-packets within a certain time after reception of the last packet, it starts sending a predefined number of special packets (timeout packets). Reception of these server-originated packets gives an indication to the client that the upstream stopped, and the duration of the upstream interruption.

The following server parameters can be remotely configured, using a secure TCP connection with the server on the same port:

the amount of octets to which it shall fill up the reflected UDP-packets;

the time before it starts sending its own packets to indicate the interruption of client packets;

the number of own packets after interruption of client packets.

The measurement logging is done by two log files: the A-log file (second log file) and the R-log file (first log file). The R-log file is filled with all packets that returned from the server. The content of the A-file consists of general information on the measurement, like the used packet pattern, as well as exceptions, which have been recorded by the client, like lossed packets.

The client stores every sent packet in a ring buffer (not specifically shown), and checks every received packet which the contents of the ring buffer. If the packet is recognized, it is stored in the R-result file, together with its round trip time and the one-way delay time. The latter is only usable if client and server clocks are synchronized.

In case the packet is unknown the packet content is stored in the A-log file. This happens for example in case of reception of a server originated packet.

If a packet did not return within the length of the ring buffer, it is deleted from the buffer and stored in the A-log file as 'lost'. Packets which are not marked as 'returned' when the measurement stops are also stored in the A-log file.

Server Part

The server listens on a defined port for both UDP packets and TCP connect requests. The port number is given as a parameter in the command line to boot the server.

In case of reception of a UDP packet:

If the first character of the client packet is a 'C' (i.e., this is a control data packet) and the characters from the 19th until the 30th position are valid numbers the packet is processed as follows:

Syntax of the command packet: CYYYYMMDDH-HmmSSNNNiiiigggnnn

Example: C20030422105256873012507000050

Where:

YYYY: year, 2003 mM: month, 04

DD: day, 22

HH: hour, 10 mm: minute, 52

SS: second, 56

NNN: millisecond, 873 iiii: interval between the packets, 125 ms gggg: packet size, 700 octets nnn: number of packets, 50

The date and time stamp of the packet reflect its actual transmission time, derived from the client's clock. After reception of this packet, the server starts the server-originated packet sequence according to the parameters iiii, gggg and nnn. After sending the last packet, the server returns to a standby state. The payload of the packets sent by the server contains the RTT's (round-trip times) of the last measurement session.

The server remains alert for other commands during the transmission. These commands might override former commands. Example: if the server is in the state of transmitting 1000 packets with an interval of 1000 ms, the client may send a new command requesting 1 packet. Then only this single packet will be sent by the server and the other packets will not be sent.

If the received UDP packet does not start with the character 'C' the packet is sent back to the client, extended with a timestamp which indicates the time on which the server received the packet. It is coded in the same way: YYYYM-MDDHHmmSSNNN.

In case the packet size is less than the requested size, the packet is filled up to the requested size, using a sequence of the character 'A' (predefined bit pattern).

After reception of a packet like this, a timer is started. This timer can be remotely configured using the HW command (see the TCP section below). If no new packet is received before the timer expires, the server starts sending server-originated packets with a packet size, to be configured with the HE command. The packets are coded like:

SqqqqYYYYMMDDHHmmssNNN, where:

'S': 'server originated packet';

qqqq: packet sequence number;

YYYYMMDDHHmmssNNN: date and time stamp of packet transmission.

The packet sequence numbers count from the maximum (configured by the HE command, default 19) down to zero.

Treatment of TCP

TCP is used in a Telnet-like session to configure the server remotely to obtain maximum flexibility. In case of a TCP connect event, the server sends the string 'password:' to the client. If the next received string via the TCP connection does not match the defined password, the server terminates the TCP connection. If the next received string matches the defined password, the server leaves the TCP connection open and sends an overview of the commands to the user. These commands are:

HV<n>: all returned UDP packets are filled up to <n> octets (if <n><packet size to be returned, then we do not fill the packet up, nor cut it down to prevent loss of information)

HW<n>: if within <n> milliseconds no UDP packets are received, the server starts transmitting its own packets;

HI<n> <n> defines the time in milliseconds between the server originated packets;

HE<n> <n> defines the maximum number of server originated packets.

Each command must be given as a separate line.

The default settings are: HV0, HW1000, HI1000, HE20.

The set parameters are stored in memory. These could be stored in a configuration file, which loads the last parameters on reboot.

On TCP disconnect the server terminates the session and a new login is required.

Client Part

A user interface can offer the user three main ways to generate UDP packets:

1. With a defined time interval (uniform);

2. With a defined time interval, poisson distributed;

3. According to a packet transmission schedule file (Chirp).

In all cases the transmitted packet size and packet interval time can be defined. In the first two cases, the packet size and interval time definition are fixed during the whole test. In the case using the packet transmission schedule file, each transmitted packet can have a different packet size and interval time, to be defined in an external file stored on disk: 'CHIRP-.TXT'. An example of this file:

|  |
| --- |
| 2000 300 H |
| 700 300 H |
| 700 300 H |
| 700 300 H |
| 700 300 H |
| 700 300 H |
| 700 300 H |
| 700 300 H |
| 10 30 B |
| 10 30 B |
| 10 30 B |

The first column defines the waiting time before the packet is sent, the second column defines the packet size in octets and the last column defines the first letter of the packet to be sent. Fields are delimited with a space.

Analysis of 'Chirp mode' packet sequences requires the packets to be identified. In the actual version the analysis program identifies slow streaming packets with the letter 'H' (normal packets) and buffer filling stream packets with the letter 'B' (burst packets).

The client stores every sent packet in a ring buffer slot, and marks it as 'sent'. If this ring buffer slot is still filled with a frame which did not return so far, this frame is deleted from the ring buffer and marked as lost in the A-log file.

All packets are reflected by the server, which appends a timestamp and (depending on its configuration) additional payload.

At the start of each test, two log files are opened by the client: 'AYYYYMMDDHHmmSS.TXT' and 'RYYYYM-MDDHHmmSS.TXT' in which YYYYMMDDHHmmSS reflects the date and time of the start of the measurement.

The A-file contains general information on the measurement, like the content of the chirp file, the size of the received packets from the server, and exceptions which occurred, like lost packets and reception of unidentified packets.

The R-file contains the reception time, round-trip time, one way delay time and the header letter of each matched packet.

The client is continually alert on incoming UDP packets. Each received packet is compared with the content of the ring buffer. If the packet matches, the client clears its copy in the ring buffer so the ring buffer slot becomes free. The client calculates the roundtrip time of the packet. If server and client are synchronized the one way delay can be calculated also, taking the server time stamp into account. The results are stored in the R-file.

If a frame does not match with the content of the ring buffer, it is stored in the A-log file as unidentified.

Measurement Procedure

The UDP network test consists of one or more test sequences.

A sequence of frames is transmitted by a UDP client over the GPRS network under test according to the content of a so-called 'chirpfile'. These frames are received by a UDP server, tagged with the reception time, extended to a defined number of octets (e.g., 700 octets), and sent back to the client.

Our chirpfile now consists of the following settings (to be read in one column)

| | | | | |
| --- | --- | --- | --- | --- |
| 700 300 H | 700 300 H | 700 300 H | 700 300 H | 700 300 H |
| 700 300 H | 700 300 H | 700 300 H | 700 300 H | 700 300 H |
| 700 300 H | 700 300 H | 700 300 H | 10 30 B | 10 30 B |
| 10 30 B | 10 30 B | 10 30 B | 10 30 B | 10 30 B |
| 10 30 B | 10 30 B | 10 30 B | 10 30 B | 10 30 B |
| 10 30 B | 10 30 B | 10 30 B | 10 30 B | 6000 30 B |
| 700 300 H | 700 300 H | 700 300 H | 700 300 H | 700 300 H |
| 700 300 H | 700 300 H | 700 300 H | 700 300 H | 700 300 H |
| 700 300 H | 700 300 H | 700 300 H | 10 400 U | 10 400 U |
| 10 400 U | 10 400 U | 10 400 U | 10 400 U | 10 400 U |
| 10 400 U | 10 400 U | 10 400 U | 10 400 U | 10 400 U |
| 10 400 U | 10 400 U | 10 400 U | 6000 400 U | |

This file is treated as follows:

At start of the measurement 13 frames of 300 octets are sent with an interval time of 700 ms. All these frames are labeled with the letter 'H' to indicate that they are primarily used to measure network latency. The server expands these frames to 700 octets and sends them back to the client.

This frame sequence is then followed by 17 frames of 30 octets, sent with an interval time of 10 ms. The frames within this burst are labeled with the letter 'B' to indicate their use for a downlink bandwidth measurement. The server expands these frames to 700 octets and returns them through the downlink.

After this burst A is sent, a 6000 ms pause follows. This time is used to let the network buffers empty themselves from the downlink bandwidth measurement burst.

After this, a new frame sequence of 12 frames of 300 octets is sent, each frame with an interval time of 700 ms, to do a second network latency test. All these frames are returned by the server filled up to 700 octets.

Finally a burst of 16 frames of 400 octets is sent with an interval time of 10 ms. With this burst, uplink buffers are filled to measure the available uplink bandwidth. The server also expands these frames to 700 octets and sends them back. A 6000 ms pause concludes the sequence. During this time, the network may empty its buffers and prepare itself for the next test sequence.

The sequence is continuously repeated until the operator stops it.

If the server does not receive any further client frames during a period of more than one second after reception of the last frame, it starts sending 20 server-originated frames with an interval of 500 ms towards the client's IP-address and port. This process stops if new frames are received from the client.

Note: The server-originated frame process can be changed by the user. The user may change the number of frames (default 20), their interval time (default 500 ms), and the time delay after which the process starts (default 1000 ms).

Of each frame sent by the UDP client, the label letter (packet type value) [L] as well as the transmit time (timestamp) [1] is included in the frame by the client. At reception, the server adds its reception (=transmission) time stamp [2]. When the client receives the frame back, it records its reception time [3] and calculates the round-trip time [4] by subtracting [1] from [3] and the client to server time [5] by subtracting [1] from [2]. It stores from each file [3], [4], [5] and [L] in a log file.

Note: Client and server clocks are not (very well) synchronized. Still, the server timestamp [2] can be used for several interesting calculations.

In a second log file, all special events are recorded, such as lost and unexpected frames. This log also contains a description of the measurement circumstances.

Post Processing Calculations

Latency measurements are used to determine quality of interactive traffic. The frames with [L]='H' are used for this purpose.

RTT per frame: use [4] from the log file.

Determine the client to server latency [5] of each frame, search for its minimum value, and determine for this frame a certain time value [V] for which yields: [V]:=250 ms−[5]. [V] may be a negative value.

Next, calculate for all frames normalized client to server time [5']:=[5]+[V].

Note: the 250 ms value is only an example. Any user-defined value may be used here. Absolute latency results are not possible in this way, but a good impression of the dynamic performance can be obtained.

Server to client latency [6] per frame: calculate for each frame [6]:=[4]−[5'].

Bandwidth measurements are used to determine downlink and uplink traffic speed.

For the downlink bandwidth calculation, the frames with [L]='B' of one burst are used.

Suppose [DS] as the number of octets per frame, reflected by the server.

Downlink bandwidth:=([DS]+28 octets)*(<number of frames received from server>)/([3]last frame−[3]first frame).

Note: 28 octets are added to represent IP and UDP frame overhead. The calculations are made to determine bandwidth on IP-level. Therefore, frame headers should be taken into consideration.

Note: If too few frames are received during due to frame loss, a bandwidth measurement may be discarded. For purity purposes, the number of lost frames during bandwidth measurement is reported.

For the uplink bandwidth calculation, the frames with [L]='U' of one burst are used. Now the time stamp that the server receives the client frames is taken into account.

Suppose [US] as the number of octets per frame, sent by the client in the burst.

Uplink bandwidth:=([US]+28 octets)*(<number of frames received from server>)/(([3]last frame+[5]last frame)−([3]first frame+[5]first frame))

Note: 28 octets are added to represent IP and UDP frame overhead. The calculations are made to determine bandwidth on IP-level. Therefore frame headers should be taken into consideration.

Note: If too few frames are received during due to frame loss a bandwidth measurement may be discarded. For purity purposes the number of lost frames during bandwidth measurement is reported.

An outage is the event that a link remains silent during a minimum predefined time.

Round-trip outages (All outages, whether uplink or downlink):

if (round-trip time [4]received frame−round-trip time [4]former received frame)>2000 ms, then an outage is reported.

If between these two frames, one or more frames were lost, this is included in the outage report.

Downlink Outages:

if (latency [5']received frame−latency [5']former received frame)>2000 ms then an outage is reported.

If between these two frames one or more frames were lost, this is included in the outage report.

Uplink Outages:

if (latency [6]received frame−latency [6]former received frame)>2000 ms then an outage is reported.

If between these two frames one or more frames were lost, this is included in the outage report.

Of each outage is reported:

time stamp time duration number of lost frames during the outage

Note: The time constant can be configured by be user (default 2000 ms).

Geographical Information

By combining the post processing calculations with simultaneously performed low level measurement by the mobile telephone (e.g., radio channel number, base station identity, mobility figures, field strength and/or radio link control) and/or geographic information (e.g., using GPS), the network quality at a geographic location becomes visible. This enables indicating poor data network quality in geographical areas, simplifying a search for weak spots in the data network.

The invention claimed is:

1. A system for measuring the quality of a data network, the system comprising a client computer and a server computer, the client computer and the server computer being arranged to communicate via the data network using a connection-less transmission protocol, wherein:

the client computer is arranged to send data packets to the server computer so as to define transmitted data packets, each of the data packets having a first timestamp indicating a time at which said each data packet was sent to the server computer;

the server computer is arranged to:

receive at least one of the transmitted data packets so as to define received data packets and send, for each one of the received data packets, a corresponding modified data packet to the client computer so as to define modified data packets, the corresponding modified data packet having the first timestamp from said one received data packet and a second timestamp, the second timestamp indicating a time at which said one received data packet was received at the server computer; and send a timeout data packet to the client computer when a predefined amount of time has elapsed since a most recent one of the received data packets was received by the server computer; and wherein the client computer is further arranged to:
store first and second log files with the modified data packets received from the server being stored in the first log file and the timeout data packet being stored in the second log file;
store each of the transmitted data packets in a ring buffer;
check each of the modified data packets received from the server with contents of the ring buffer; and
if one of the modified data packets is not received by the client computer within a length of the ring buffer, delete from the ring buffer a particular one of the transmitted data packets and which is associated with said one modified data packet and store the particular one transmitted data packet so deleted in the second log file.

2. The system recited in claim 1 wherein:
the server computer comprises a server processor connected to a server memory, the server processor being arranged to read from the server memory a timeout value indicating a predefined amount of time, a server interval value and a quantity value; and
the server computer being further arranged to send successive timeout data packets, with an interval time equal to the server interval value, until a next one of the transmitted data packets is received or a maximum number of timeout data packets sent by the server computer equals the quantity value.

3. The system recited in claim 2 wherein the client computer comprises a client processor connected to a client memory, the client processor being arranged to read from the client memory, for each one of the transmitted data packets, a client interval value, a client packet size value and a packet type value;
the client computer further being arranged to send the transmitted data packets with an interval time equal to the client interval value; and
each of the transmitted data packets having the packet type value and a client payload, the client payload filling said each transmitted data packet up to a first predefined size equal to the client packet size value.

4. The system recited in claim 3 wherein the packet type value signifies either a "normal packet" or a "burst packet".

5. The system recited in claim 3 wherein the client memory is a file stored on a disk.

6. The system recited in claim 1 wherein each of the transmitted data packets comprises a sequence number.

7. The system recited in claim 2 wherein the server processor is arranged to read, from the server memory, a server packet size value; and
the corresponding modified data packet having a server payload, the server payload filling the corresponding modified data packet up to a second predefined size equal to the server packet size value.

8. The system recited in claim 3 wherein the client payload comprises a predefined or random bit pattern.

9. The system recited in claim 7 wherein the server payload comprises a predefined or random bit pattern.

10. The system recited in claim 1 wherein the connectionless transmission protocol is UDP/IP.

11. The system recited in claim 2 wherein the client computer is further arranged to send a configuration packet to the server computer, the configuration packet comprising the timeout value, the server interval value, the quantity value and a server packet size value;
the server computer is further arranged to receive the configuration packet; and
and the server processor is arranged to write to the server memory the timeout value, the server interval value, the quantity value and the server packet size value from the configuration packet so received.

12. The system recited in claim 2 wherein, for configuring the server computer, the client computer is further arranged to communicate with the server computer via the data network using a connection-oriented transmission protocol;
the server computer is further arranged to receive configuration data from the client computer, the configuration data comprising the timeout value, the server interval value, the quantity value and a server packet size value; and
and the server processor is arranged to write to the server memory the timeout value, the server interval value, the quantity value and the server packet size value from the configuration data so received.

13. The system recited in claim 12 wherein the connection-oriented transmission protocol is TCP/IP.

14. The system recited in claim 1 wherein the client computer is further arranged to calculate a round-trip time by subtracting the first timestamp from a timestamp indicating when the corresponding modified data packet is received in the client computer and store the round-trip time in the first log file.

15. The system recited in claim 1 wherein the client computer is further arranged to calculate a client-to-server latency by subtracting the second timestamp from the first timestamp and store the client-to-server latency in the first log file.

16. The system recited in claim 15 wherein the client computer is further arranged to read, from the first log file, a packet type value, the client-to-server latency and a round-trip time and calculate, for each one of the modified data packets having a packet type value equal signifying a "normal packet", a server-to-client latency by subtracting the client-to-server latency from the round-trip time.

17. The system recited in claim 15 wherein the client computer is further arranged to read, from the first log file, the packet type value and calculate a downlink bandwidth using the following equation:

$$(\#BytesPerPacket+Overhead)*(\#BurstPackets)/(t2-t1)$$

where:
BytesPerPacket is, in bytes, a length of the modified data packet;
Overhead is, in bytes, a length of protocol header overhead;
BurstPackets is a number of the modified data packets stored in the first log file having the packet type value signifying a "burst packet";
t1 is a timestamp indicating when a first one of the modified data packets is received in the client computer; and
t2 is a timestamp indicating when a last one of the modified data packets is received in the client computer.

18. The system recited in claim 15 wherein the client computer is further arranged to read, from the first log file, the packet type value and calculate an uplink bandwidth using the following equation:

$$(\#BytesPerClientPacket+Overhead)*(\#BurstPackets)/((t2+t4)-(t1+t3))$$

where:
BytesPerClientPacket is, in bytes, a length of the data packet;
Overhead is, in bytes, a length of protocol header overhead;
BurstPackets is a number of the modified data packets stored in the first log file having the packet type value signifying a "burst packet";

t1 is a timestamp indicating when a first one of the modified data packets is received in the client computer;

t2 is a timestamp indicating when a last one of the modified data packets is received in the client computer;

t3 is the client-to-server latency for the first modified data packet; and t4 is the client-to-server latency of the last modified data packet.

19. The system recited in claim 15 wherein the client computer is further arranged to read, from the first log file, a round-trip time and a sequence number and determine a round-trip outage as follows:

if($Rtt2-Rtt1$)>t5 then roundtrip outage=true where:

Rtt2 is the round-trip time;

Rtt1 is the round-trip time of a previous one of the modified data packets, the client computer being arranged to identify the previous modified data packet by the sequence number; and t5 is a predefined amount of time.

20. The system recited in claim 15 wherein the client computer is further arranged to read, from the first log file, the client-to-server latency and a sequence number and determine a downlink outage as follows:

if($Rtt4-Rtt3$)>t5 then downlink outage=true where:

Rtt4 is the client-to-server latency;

Rtt3 is the client-to-server latency of a previous one of the modified data packets, the client computer being arranged to identify the previous modified data packet by the sequence number; and t5 is a predefined amount of time.

21. The system recited in claim 16 wherein the client computer is further arranged to read, from the first log file, a sequence number and determine an uplink outage as follows:

if($Rtt6-Rtt5$)>t5 then uplink outage=true where:

Rtt6 is the server-to-client latency;

Rtt5 is the server-to-client latency of a previous one of the modified data packets, the client computer being arranged to identify the previous modified data packet by the sequence number; and t5 is a predefined amount of time.

22. The system recited in claim 19 wherein the client computer is further arranged to determine a number of lost packets between two of the modified data packets by analyzing corresponding sequence numbers of the two modified data packets.

23. The system recited in claim 14 wherein the client computer is further arranged to combine the round-trip time with low level measurement data from a mobile telephone or geographic information data.

24. A method for measuring the quality of a data network, the system comprising a client computer and a server computer, the client computer and the server computer being arranged to communicate via the data network using a connection-less transmission protocol, the method comprising the steps of:

in the client computer, sending data packets to the server computer so as to define transmitted data packets, each of the data packets having a first timestamp indicating a time at which said each data packet was sent to the server computer;

in the server computer:

receiving at least one of the transmitted data packets so as to define received data packets and send, for each one of the received data packets, a corresponding modified data packet to the client computer so as to define modified data packets, the corresponding modified data packet having the first timestamp from said one received data packet and a second timestamp, the second timestamp indicating a time at which said one received data packet was received at the server computer; and sending a timeout data packet to the client computer when a predefined amount of time has elapsed since a most recent one of the received data packets was received by the server computer; and further in the client computer:

storing first and second log files with the modified data packets received from the server being stored in the first log file and the timeout data packet being stored in the second log file;

storing each of the transmitted data packets in a ring buffer;

checking each of the modified data packets received from the server with contents of the ring buffer; and if one of the modified data packets is not received by the client computer within a length of the ring buffer, deleting from the ring buffer a particular one of the transmitted data packets and which is associated with said one modified data packet and storing the particular one transmitted data packet so deleted in the second log file.

25. The method recited in claim 24 further comprising the steps of:

reading from a server memory, in the server computer, a timeout value indicating a predefined amount of time, a server interval value and a quantity value; and sending successive timeout data packets, with an interval time equal to the server interval value, until a next data packet is received or a maximum number of timeout data packets equals the quantity value.

26. The method recited in claim 25 further comprising the steps of:

reading from client memory, in the client computer and for each of the transmitted data packets, a client interval value, a client packet size value and a packet type value; and sending the transmitted data packets with an interval time equal to the client interval value, each of the transmitted data packets having a packet type value and a client payload, the client payload filling said each transmitted data packet up to a first predefined size equal to the client packet size value.

* * * * *